UNITED STATES PATENT OFFICE.

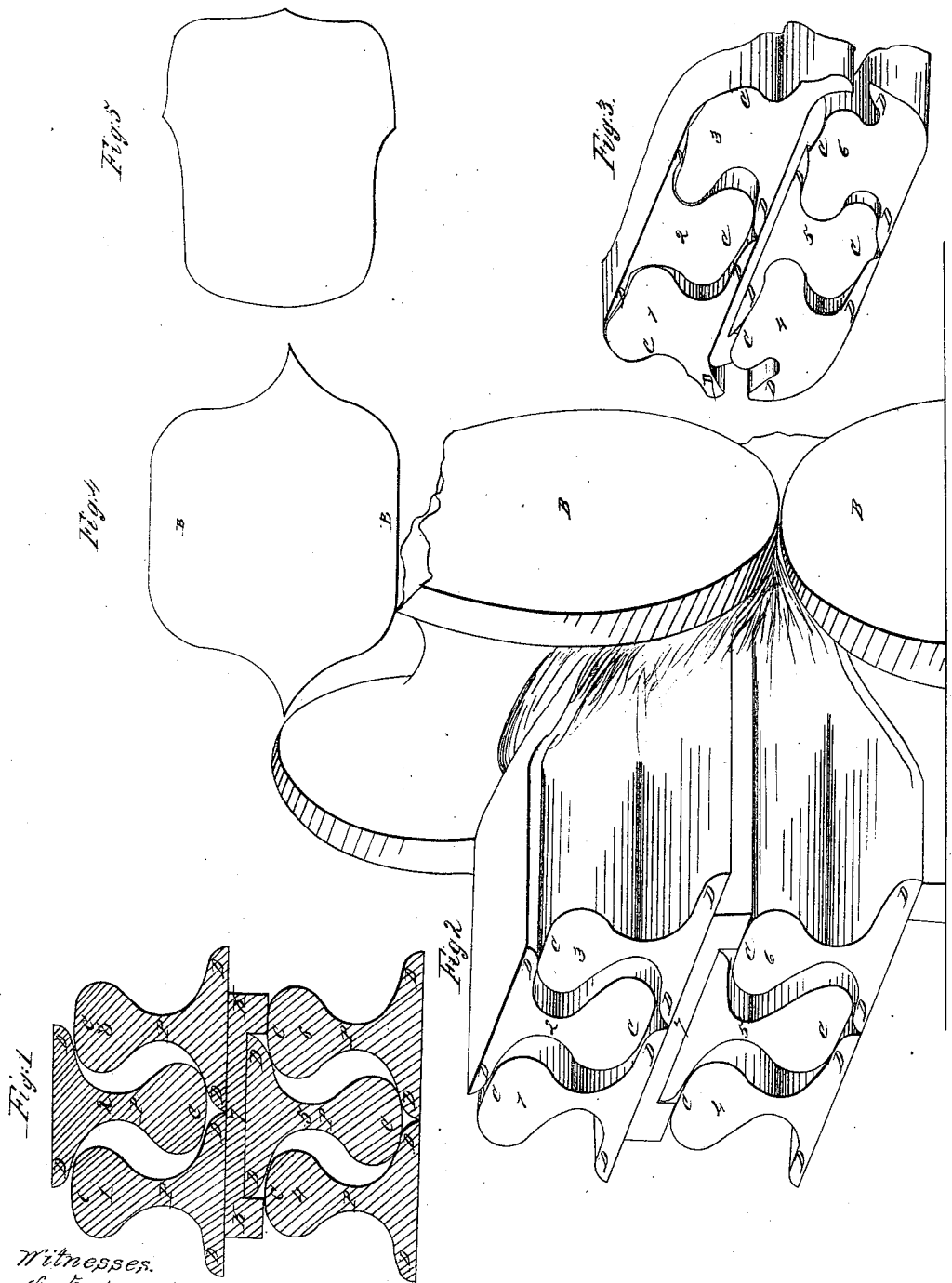

JOHN THOMAS, OF INDIANAPOLIS, INDIANA, ASSIGNOR TO HIMSELF AND JOHN M. LORD, OF SAME PLACE.

PILING RAILROAD-BARS FOR REROLLING.

Specification of Letters Patent No. 26,237, dated November 22, 1859.

*To all whom it may concern:*

Be it known that I, JOHN THOMAS, of the city of Indianapolis, county of Marion, and State of Indiana, have invented a new and Improved Mode of Piling and Arranging T-Rails and other Old Irons for Reworking; and I do hereby declare that the following is a full, clear, and exact description thereof, reference being had to the accompanying drawings, and to the letters and figures of reference marked thereon, which drawings are numbered 1, 2, 3, 4, and 5.

Figure (1) represents an end view of six pieces of (T) rails numbered 1, 2, 3, 4, 5 and 6 with their tie number (7). Fig. (2) reprecents a perspective view of the same as passing through the rollers (B) (B) Figs. (2) and (4). Fig. (3) represents a perspective view of the "pile" after it has passed through the first heat and rolling, and Figs. (4) and (5) represent the peculiar shape of the groove in the rollers that are used to gain the desired object explained below.

Fig. (1) represents six pieces of (T) rails arranged in a "pile," having two tiers of three rails in each numbering (1) (2) (3) (4) (5) and (6), with their tie number (7), prepared for reworking. In each tier they are so arranged that two of the treads (C) (C) (C) are turned up and one down, thereby throwing the concave of the shanks P, P, P and the convex of the treads (C) (C) (C) of each tier in close connection with each other, in which arrangement the flanges (D) (D) of number (2) and the treads (C) (C) of numbers (1) and (3) are depressed and locked together, and the flanges (D) (D) in number (1) and (3) are locked over the end of the tie No. (7) which tie is depressed and locked in the treads (C) (C) of numbers 4 and 6 (see Fig. 3) and the flanges (D) (D) of 4 and 6 are thrown up and locked with that portion of the flange numbers (1) and (3) which is locked over the treads (4) and (6) while the flanges (D) (D) of number (5) are locked with the treads of numbers 4 and 6, also, with the bar number (7), and that portion of the tie marked (K) (K) is locked with the flanges (D) (D) (D) of (1) (3) and (5) also the treads (C) (C) (C) of (4) and 6 Fig. (3), by which interlocking they have become so firmly united, that when the new rail is finally completed and in use they cannot be split or parted asunder by the jarring or pressure of the cars in passing over the rails, entirely overcoming that flakey, laminating defect so often found in T rails that are manufactured of old iron and reworked of T rails; preventing loss of tenacity, ductility and malleability, thereby keeping the iron in a perfect condition for welding during the process of rolling, completely consolidating the several bars in one solid body.

Fig. 2 represents the "pile" as passing through the rollers (B) (B) which are grooved as represented in Fig. (4) which gives them the shape as seen in Fig. (3), from whence they pass through another set of rollers the grooves of which are shaped as seen in Fig. (5) when they become locked and united together as above described and are prepared to pass into the old process of making the T-rail.

The nature of my invention and the advantage to be gained by its use will readily be comprehended when the object to be attained is correctly understood. In manufacturing of T-rails the treads C C C C C C of the bars, which come in contact with the car wheels, also the flanges (D) (D) (D) (D) (D) (D), have to be made of a superior quality of iron, while the middle and shank (P) (P) (P) (P) (P) (P) can be made of an inferior quality. Then in order to accomplish this object the bars of iron from which the T-rails are originally manufactured are so arranged that in passing through the rollers which give them their shape the good iron is thrown into the treads and flanges of the rails, and the poor iron into the middle and shanks of said rails; then by thus arranging the old rails into a "pile" as shaped in Fig. (1), the very same object is accomplished that is anxiously sought in the first and original process of making the T rail.

To enable others to understand the nature of my invention and the advantages gained by its use, we have only to compare it with the old process of making the T rail, which consists in taking old iron or the T rail to be re-worked and rolling them into bars, one inch thick and six inches wide, after which seven of these flat bars are placed one upon the other, tied together by rods of iron after which they pass through the process of heating and rolling into the T rail; the value of which depends upon its solidity, which solidity is dependent on the tenacity, ductility and malleability thereof. In the process of bringing these bars to a white or welding heat, there is a continued escaping of air through them, the effect of which is to cause that portion of the iron which gives it the above described properties to escape from the center to the surface of the bars, thereby loosing the coherent properties thereof to the extent of the waste of that part of the iron which gives it its tenacity, ductility and malleability. Hence the cause of that scaly laminating defect, found to such an extent in the bars made of old iron and other T rails. But by the mode of piling and locking the ties together as seen in Figs. (1) and (3) the rails that were so defective in the other process of making, have by this method become perfect and complete.

By again referring to the drawings Fig. (3) it will be seen that as the pile has passed through the first set of rollers the flanges (D) (D) of numbers (4) and (6) are thrown up and the flanges (D) (D) of numbers (1) and (3) are thrown down and nearer together by the pressure of the rollers (B) (B) so that in passing through the next rolling they will be enveloped in the flanges (D) (D) of numbers (4) and 6, and the ends of the tie number (7) are forced into the treads (C) (C) of numbers (4) and (6) at the same time locking the flanges (D) (D) of number (5) at each end and the flanges (D) (D) of number (2) are spread over and depressed in the treads of numbers (1) and (3) so that the better quality of iron is not only kept on the surface of the "pile," but in such a position that it will fall into the treads and flanges of the new rail and has become so firmly locked that they cannot be separated although not welded. Here remarking that up to the present state of the "pile" it has only been brought to a flux heat, which is only sufficient to give it the interlocking tie as above described and seen in Fig. (3).

We now take the pile into a second process where it is brought to a white or welding heat, and as that part of the iron by which the welding is accomplished and which exists in a state of fluidity, when brought to a white heat, no possible means of escape as heretofore explained, in consequence of the solidity of the "pile" which is gained in consequence of the interlocking process, it must necessarily seek bent and escape into the space between the bars that yet remains open, and being of a liquid nature when in this state of heat it finds its way into every crack and curve, cementing the whole firmly together, in consequence of which those parts of the T rail which hitherto have been so imperfect, have now become dense and solid, simply from the fact, that by the process thus described and shown in Fig. (3) of locking the rails together and intertying one bar with the other that the superior quality of the iron is confined and brought in that portion of the new rail where the defects have hitherto been found.

The advantages gained by this invention are first, preserving the tenacity, ductility, and malleability of the iron. Secondly, throwing the good iron upon the surface of the pile, from whence it is again thrown into the treads and shanks of the T rail. Thirdly, so effectually to lock and weld the iron as effectually to prevent the laminating defect of the T rails which are made of old rails and iron, and fourthly it is economical, saving the labor of rolling into flat bars, also saving once heating and handling thereof.

I claim—

The tie No. 7 or its equivalent when used for interlocking T rail or other old iron, and forming the pile of six rails shown in Fig. 1, when constructed and arranged substantially as and for the purposes set forth.

JOHN THOMAS.

Witnesses:
S. RUTHENBURG,
R. S. GEE.